Jan. 10, 1967     I. R. SHERMAN     3,297,238
BYPASS CORE DUCTED FAN WITH OUTER PERIPHERAL BEARINGS
Filed Feb. 5, 1965     4 Sheets-Sheet 1

INVENTOR
IRVING R. SHERMAN
BY *James H. Littlepage*
ATTORNEY

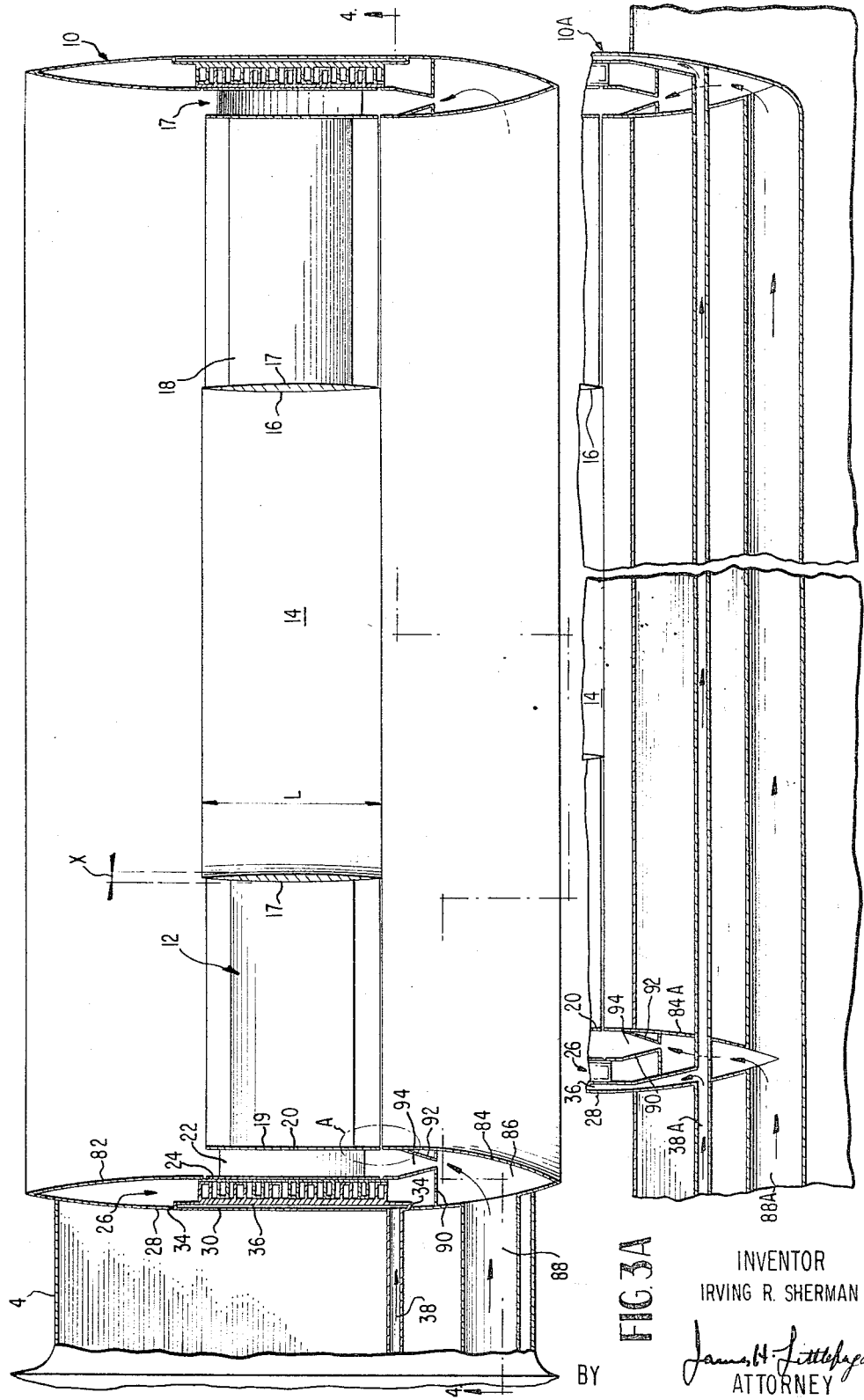

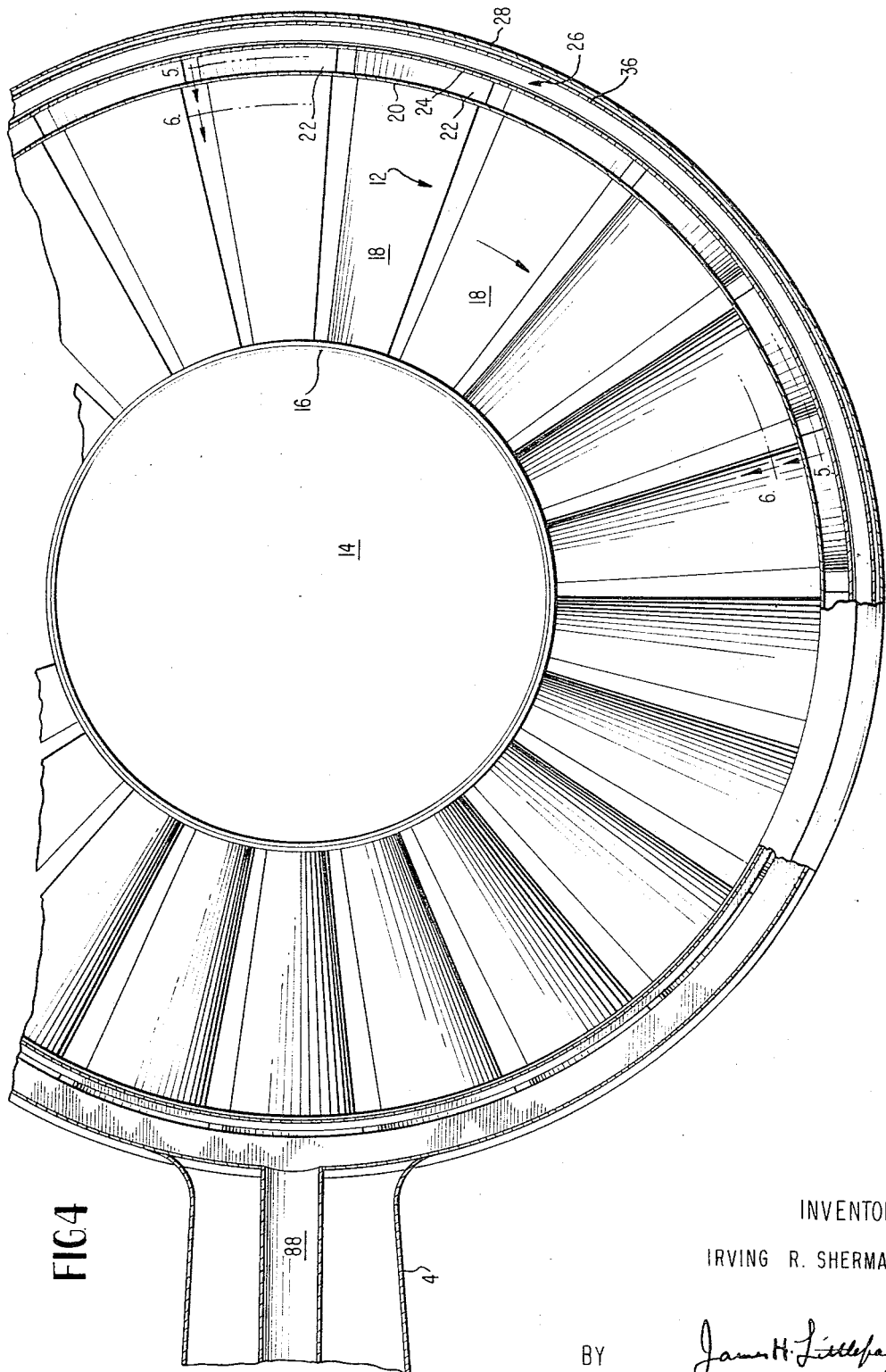

Jan. 10, 1967     I. R. SHERMAN     3,297,238
BYPASS CORE DUCTED FAN WITH OUTER PERIPHERAL BEARINGS
Filed Feb. 5, 1965     4 Sheets-Sheet 4
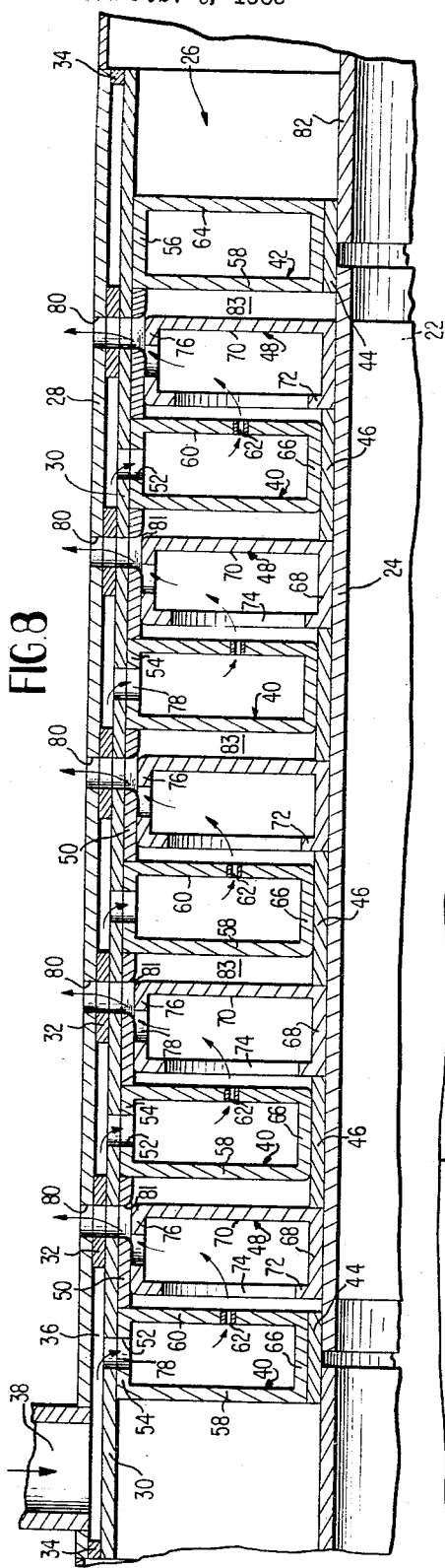
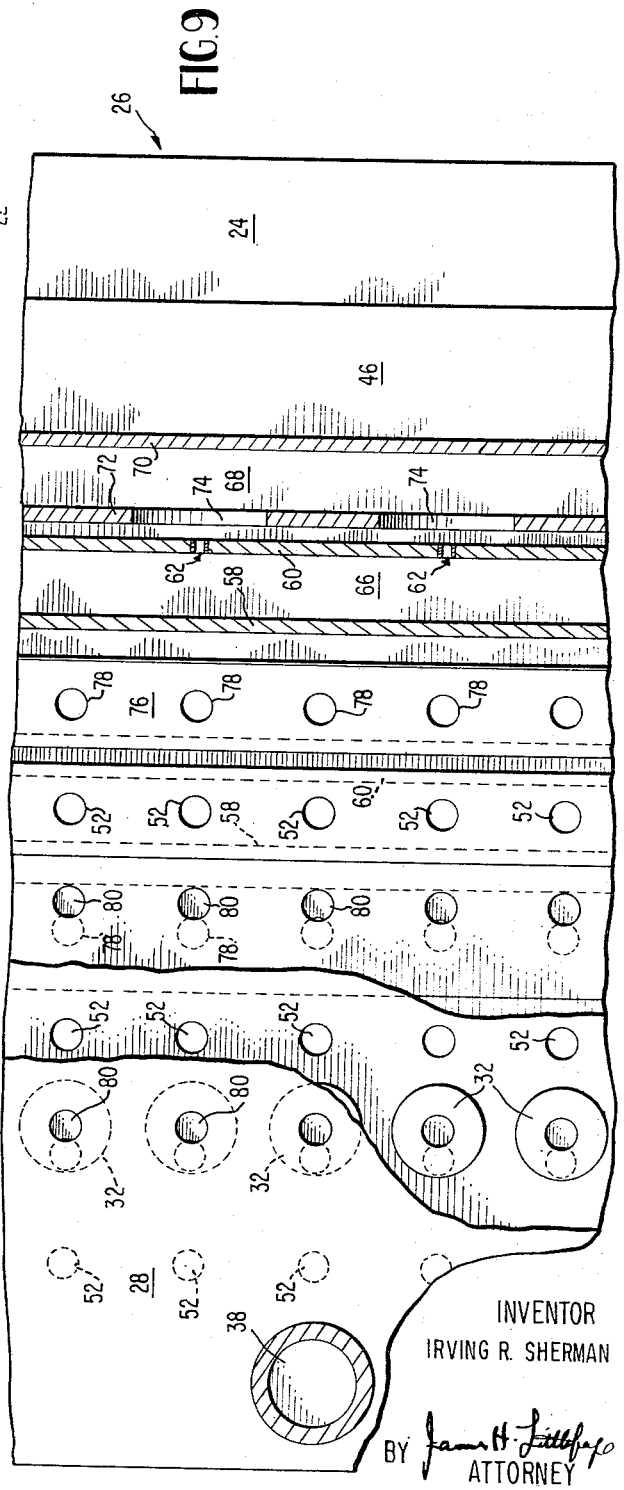
INVENTOR
IRVING R. SHERMAN
BY *James H. Littlepage*
ATTORNEY United States Patent Office 3,297,238
Patented Jan. 10, 1967

3,297,238
BYPASS CORE DUCTED FAN WITH OUTER
PERIPHERAL BEARINGS
Irving R. Sherman, 131 Magazine St.,
Cambridge, Mass. 02140
Filed Feb. 5, 1965, Ser. No. 430,581
11 Claims. (Cl. 230—116)

This invention relates to aircraft propulsion means and, more particularly, to a ducted fan having tip-turbine drivers around the periphery thereof. Related applications filed concurrently herewith by me are entitled, Bypass Core Ducted Fan With Inner and Outer Peripheral Bearings and Gas Bearing.

Typical ducted fans over which this invention constitutes an improvement are shown in the patents to Ferri 3,018,034, Kent 3,070,284 and Tharp 3,132,842, wherein fan blades radiate from a hub nacelle. Even though the nacelle be streamlined, it imposes a drag on the air flowing through the fan. For a streamlined body such as a nacelle, drag depends essentially upon finesse ratio which, generally speaking, is the diameter at the largest cross-section divided by the length. Design considerations impose certain practical design limitations upon the diameter and length of nacelles. If attempt be made to reduce the finesse ratio by reducing the diameter of the nacelle at the point of greatest cross section, which is where the inner ends of the fan blades terminate, then the blade density and overlap of the inner blade ends becomes such as to produce drag or shock at high subsonic and supersonic speeds. The inner ends of the blades must be thick enough to provide a strong connection with the nacelle, and taking into account the necessary chord length and blade pitch, the inner portion of a fan with a nacelle restricts the flow of air and takes on some characteristics of a wall when high subsonic air speeds are reached. In fact, it is demonstrable that under certain conditions the inner portions of a fan exert forces opposite to those desired. Thus, with an ordinary ducted fan with a nacelle, assuming a blade pitch of from 12° to 16° at the tips and perhaps as high as 75° at the hub, the thrust of the blades near the hub is sidewise at low speeds, which opposes the torque force rotating the fan. Hence, the inner portions of the blades are not only useless, but together with the drag of the nacelle, results in a relatively inefficient device. A finesse ratio of less than 10% is considered suitable for high subsonic or supersonic speeds, whereas nacelles with a finesse ratio greater than 10% are considered thick and suitable only for low and medium speeds (up to about 450 m.p.h.), and the above-noted limitations make it impractical to attain finesse ratios of 10% or less. One of the objects of the invention is to provide a ducted fan having the inner ends of the blades connected by a structure having a finesse ratio of no more than 10%. It is proposed now to provide a ducted fan having the inner ends of the blades connected to and radiating from a hollow, generally cylindrical body hereinafter referred to as a "hollow core." Since the cross-sectional thickness of the hollow core wall need not be large as compared to the depth of the cylindrical duct, a very favorable finesse ratio is attained.

Of as great or even greater importance than finesse ratio is the effect of the hollow core on the air flowing through the fan. At lower speeds, the energy in the slipstream of the hollow column of air flowing through the fan blades entrains an inner column of air which flows through the hollow core. Thus the hollow core fan acting as an ejector produces more thrust by making use of energy which is wasted by the nacelle fan. As an aircraft utilizing a nacelle fan reaches high subsonic (about 550 m.p.h) speeds, the air flow through the fan is considerably higher since it includes the air directly in front of the nacelle and hence the fan chokes when flow of air at any point within its duct reaches sonic velocity. According to the subject invention, which utilizes a hollow core fan, the air directly in front of the hollow core and part of the air directly in front of the blades bypasses through the hollow core. Not only are choking and the setting up of shock waves greatly delayed, but also a higher net thrust is produced because the mass flow of air is increased by the flow of air through the hollow core.

A particular object of this invention is to provide a fan of the type described wherein the rotating parts of rotatably supported by an outer peripheral bearing surrounding the outer periphery of the turbine, and wherein an inner duct, which surrounds and defines the hollow core, is fixed to and rotates with the inner ends of the fan blades.

These and other objects will be apparent from the following specifications and drawings, in which:

FIG. 3 is a transverse cross-section along the line 3—3 of FIG. 1;

FIG. 3A is a transverse cross-section along the line 3A—3A of FIG. 2;

FIG. 4 is a front elevation, partly in cross-section showing the invention in the configuration of FIG. 1 and FIG. 3;

Figure 5:
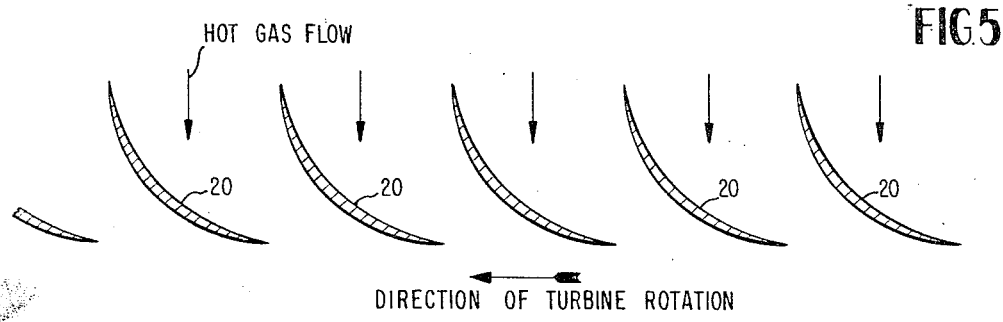
Figure 6:
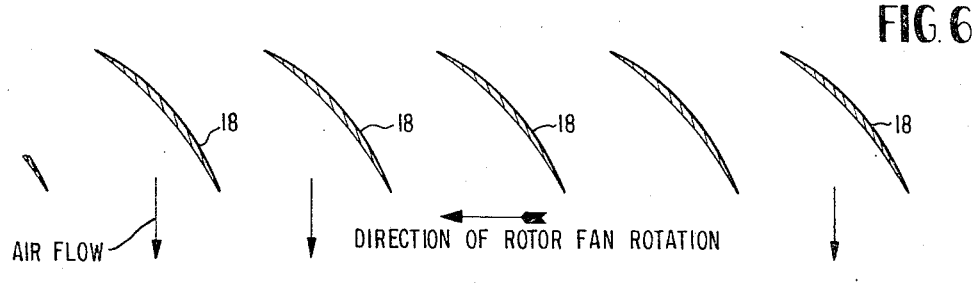
Figure 7:
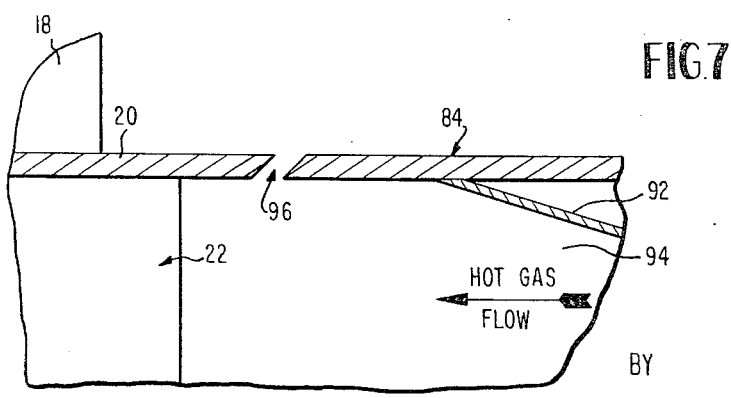

FIGS. 5 and 6 are diagrammatic cross-sectional views along the arcs 5—5 and 6—6 of FIG. 4, showing the relative pitches of the turbine and fan blades;

FIG. 7 is an enlarged fragmentary section showing the details within the balloon A in FIG. 3;

FIG. 8 is an enlarged cross sectional view showing a gas bearing such as may be used for supporting the turbine at the outer periphery of the hollow core fan; and, FIG. 9 is a diagrammatic "peeled-away" view illustrating the arrangement of the openings and gas passages shown in FIG. 8.

Figure 1:
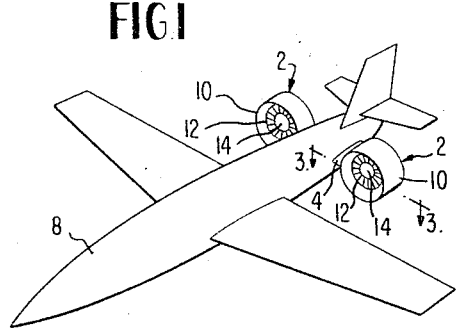
FIG. 1 is an elementary view, in perspective, of an airplane employing the subject hollow core ducted fans in tail location.
Figure 2:
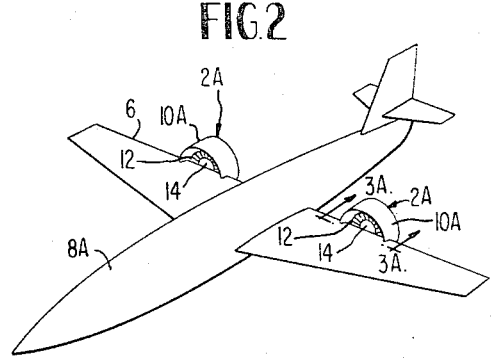
FIG. 2 is a view similar to FIG. 1, but showing another configuration wherein the hollow core ducted fans are mounted on the trailing edges of the wings.

Referring now to the drawings, in which like reference numerals denote similar elements, FIG. 1 and FIG. 2 show two typical modes for mounting the bypass core ducted fan 2 or 2A with which this application is concerned. In FIG. 1, ducted fans 2 are mounted at the outer end of the stub wings 4 near the tail of an aircraft 8, whereas in FIG. 2 ducted fans 2A, which are essentially the same as fans 2, are mounted on the main wings 6 of aircraft 8A. Ducted fans 2 or 2A include an outer duct 10 or 10A and fan units 12 which surround hollow bypass cores 14. It will be understood that the ducted fans may also be mounted elsewhere on an aircraft or ground effects machine, that they are driven by turbines detailed hereinafter which surround the fan units 12 and which are powered by hot gases derived from a hot gas generator, such as a jet engine (not shown). The turbines are supported at their peripheries by suitable bearings, such as the gas bearings described hereinbelow and which are the subject of my co-pending application entitled, Gas Bearing, filed concurrently herewith, it being understood that other suitable bearings may be utilized. If gas bearings are utilized, it is preferred that they receive gas or air under pressure derived from the hot gas generator in the aircraft. For example, if a jet engine is used to generate the hot gases, air under pressure could be bled off from the compressor. The supply of hot gases and air under pressure for propulsion and gas bearings is well known to those skilled in this art.

Referring now particularly to FIGS. 3 and 4, ducted fan 2 which is adapted for mounting on a stub wing 4 will be described. At the center, in the space normally occupied by a hub with a nacelle, is a hollow core 14 surrounded by a generally cylindrical inner duct 16. Inner duct 16 should be of streamline configuration, preferably as shown. Being of thin maximum cross-section X with respect to its length L, the finesse ratio $X/L$ of inner duct 16 is less than 10% so that it imposes very little drag even at high subsonic or supersonic speeds. Affixed at their inner ends 17 around the outer side of inner duct 16 are fan blades 18, the outer ends 19 of which are affixed to a turbine base ring 20. Fan blades 18 are of conventional configuration. However, in a typical prior art fan having a rub, the pitch of the blades at their tip ends was in the range of from about 12° to 16° and the pitch at their hub ends was up to 75° so that up to 96% of the thrust of the blades at and near the hub was directed to the side. Also, in the prior art fans utilizing a hub, the blade overlap at and near the hub was such that, at high speeds, the air could not undergo the many changes in direction necessary to pass between the blades and also taking into account the blade density, the net result was that inner portion of the hub type fans was not only wasted but, particularly at high speeds, the drag at the inner portion was greater than the forward thrust produced there which was only about 10% of the lift of the blade. This problem could not be overcome practically by increasing hub diameter because then the finesse ratio would become so unfavorable that the nacelle would impose excessive drag and greatly reduce speed at which shock waves occur.

Utilizing the present invention, and assuming the pitch angle of fan blades at their outer ends 19 to be in the range of about 15° to 20° (depending upon the intended operation speed), the pitch at the inner ends 17 of blades 18 is preferably 45° to 50°, the result being that about 65% to 70% of the blade lift at the inner ends is forward thrust. In the subject invention the blade density at and near the inner duct 16 is low, there is no overlap problem, and the efficiency in terms of net forward thrust is high.

The air flowing through the fan 12 forms a column with a hollow center defined by hollow core 14. At low subsonic speeds, the faster flowing air which passes through fan 12 entrains some of the air in the center before and especially after it flows through the hollow core 14, and hence a tractive force, with a resultant forward thrust, is created by increased mass flow through hollow core 14 and resultant increase in pressure differential acting on it. At high subsonic and supersonic speeds an additional phenomenon occurs. Here there is more air which must pass through the fan than the fan without excessive compression will permit. Hollow core 14 allows some of the air, which otherwise would have to pass through the fan, to expand and bypass the fan.

Surrounding and secured to the outer ends 19 of fan blades 18 is the base ring 20 of a turbine 21, which includes an annular series of blades or buckets 22 whose outer ends are affixed to an outer ring 24 and the latter is rotatably supported in the outer wall 28 of outer duct 10 by a suitable bearing, such as gas bearing 26. Although other bearings may be utilized, the one claimed in my aforesaid co-pending application entitled Gas Bearing will be detailed.

Referring particularly to FIGS. 3, 4, 7, 8 and 9, a bearing wall 30 is supported inwardly spaced from outer wall 28 by spacer washers 32 and at its forward and rear ends, by end seal rings 34. Outer wall 28, bearing wall 30 and end seal rings 34 define an annular chamber 36 into which duct 38 leads. Duct 38 is supplied wtih air or other gas under pressure from a suitable source of supply, such as a compressor. Affixed on the inner side of bearing wall 30 are a series of axially spaced inwardly projecting annular hollow fins 40 and 42. Affixed to the inner sides of the inner walls 66 of the forward and rear stationary fins 40 and 42 are bearing bands 44, and around the intermediate portion of turbine outer ring 24 are axially-spaced bearing bands 46. Assuming fins 40 and 42 are made of ferrous metal, bearing bands 44 and 46 should be made of bearing metal such as oil impregnated bronze, to insure against seizing. Affixed around the outer side of turbine outer ring 24 are a series of axially spaced outwardly projecting annular hollow fins 48 which slidingly engage bearing bands 50. As with the previously described fins and bearing bands, they should be made of dissimilar metals having a low coefficient of friction so that even without the benefit of the pressure gas described below, a good oil lubricated bearing is provided.

The pneumatic arrangement provides a gas bearing as follows. Leading from annular chamber 36 into the interiors of hollow fins 40 are annular series of inlet holes 52 which pass through the outer wall 52 of hollow fins 40. The outer wall 56 of hollow fin 42 is blank and its interior takes no part in the pneumatic system. The front walls 58 of hollow fins 40 and 42 are blank, but the rear walls 60 of hollow fins 40 are each provided with an annular series of orifices 62. The inner walls 66 of hollow fins 40 and 42 are blank. Thus, each hollow fin 40 constitutes a plenum chamber supplied by gas under pressure through inlet holes 52. The rear wall 64 of hollow fin 42 is blank and plays no part in the pneumatics.

In the pneumatic system, hollow fins 48 function essentially as valved pistons. Their inner walls 68 are blank, as are their rear walls 70. However, their front walls 72 are each provided with an annular series of diametrically spaced large openings 74, and their radially outward walls 76 are provided with an annular series of circumferentially spaced outlet ports 78. When the outer ring 24 of turbine 21 moves rearwardly with respect to bearing wall 30 to the position shown in FIG. 8, outlet ports 78 communicate with the atmosphere via annular series of outlets 80 which pass through bearing wall 30, spacer washers 32 and the outer wall 38 of the outer duct 10.

When the outer ring 24 of turbine 21 moves forwardly of the position shown in FIG. 8, outlet ports 78 are blanked by the surfaces of bearing bands 50 so that, except for the leakage between the rubbing surfaces of the hollow fins and the bearing bands, the gas issuing rearwardly via restricted orifices has no escape route, and gas pressure builds up against the forwardly facing surfaces 70 of hollow fins 48, thereby forcing the latter, piston-like, to the rear. As soon as the outer ring 24 of turbine 21 and the hollow fins 48 thereon move rearwardly enough to open connecting cracks between outlet ports 78 and outlets 80, the gas pressure which formerly forced hollow fins 48 rearwardly is relieved. Thereupon, when the outer rear corners 81 of hollow fins 48 move rearwardly beyond the rear edges of outlets 80, air is trapped in the then closed chamber 83 between the rear walls 70 of hollow fins 48 and the front walls 58 of hollow rings 40, and thus further rearward movement of the outer turbine ring 24 relative to bearing walls 30 is pneumatically resisted. The air leaking between the rubbing surfaces of the hollow fins and bearing rings provides a cushion and holds the rubbing surfaces apart sufficiently so that there is little friction in the radical direction of the bearing, and the piston-like action of the hollow fins provides a pneumatic, nearly friction-free axial bearing for the turbine and fan.

The outer wall 28 of outer duct 10 meets at its leading edge with an inner wall 84 and they together define an annular manifold 86 for hot gas under pressure supplied by a duct 88 from the hot gas generator previously mentioned. Partitions 90 and 92 define a nozzle 94 through which the hot gas is ejected against turbine buckets 22. As detailed in FIG. 7, a slanted gap provided between inner wall 84 of the outer duct and turbine base ring 20 allows a small amount of air to be drawn by suction of hot gas flow.

The form of the invention shown in FIGS. 2 and 3A is essentially the same as the one previously detailed except in that wing 6 serves as a stator for the fan, and also as a support for the gas bearing conduit 38A and hot gas conduit 88A which lead to opposite sides of chamber 36 and manifold 86, respectively, thereby providing somewhat greater uniformity of distribution of the pressure air and hot gas. This latter form of the invention also provides somewhat greater structural strength in that the rotating assemblies are supported at two sides, rather than one as in the stub-wing mount. In this embodiment, the wing also functions as a stator for the fan, and the hot gases passing through the wing also heat the wing and reduce the formation of ice thereon.

In both embodiments, it is preferred that the hollow core 14 shall occupy about 45% of the frontal area of the assembly and the fan shall occupy about 45% of the frontal area, where the design is intended for high subsonic speeds. For lower and higher speeds, these ratios may vary, as will the pitch of the fan blades.

It will be apparent to those skilled in the art that the subject fan has utility not only for driving an aircraft forwardly, but also as a lift fan for V/STOL craft. For one reason, the supporting wing may be made thinner because the fan has no central bearing and hence no central bearing support is needed. For use as a lift fan, the length of the inner duct would be greatly shortened in order to decrease the required wing thickness. However, in such use, the finesse ratio of the duct is relatively unimportant.

The invention is not limited to the details of the structures disclosed and described herein, but is intended to cover all substitutions, modifications and equivalents within the scope of the following claims.

I claim:

1. A ducted fan for aircraft, comprising a fan having radial blades angularly spaced about an axis of rotation, annular turbine means concentric with said fan connected to outer ends of said blades and surrounding the same, bearing means for rotatably supporting said turbine means in said aircraft, means for supplying gas under pressure to said turbine means for driving the same, whereby to rotate said fan, said blades having inner ends terminating radially outward from the rotational axis of the fan, and means comprising an annular hollow ring rigidly affixed to at the inner ends of said blades, the last-named means defining a substantially cylindrical substantially hollow space.

2. The combination claimed in claim 1, the hollow space defined by said last-named means being approximately half of the frontal area of said fan.

3. The combination claimed in claim 1, said last-named means comprising a streamlined body having a wall with a thickness-to-length finesse ratio of no greater than about 10%.

4. The combination claimed in claim 1, said fan blades having a pitch angle of from about 15° to 20° at their outer ends from about 45° to 50° at their inner ends.

5. A ducted fan for aircraft, comprising a first hollow annular duct having a cylindrical wall defining a substantially hollow cylindrical space, a fan surrounding said duct, said fan having angularly spaced blades with inner ends affixed to the outer side of the duct wall and said blades radiating outwardly therefrom, a first annular ring affixed to and surrounding the outer ends of said fan blades, turbine buckets affixed to and radiating outwardly from said annular ring, a second annular ring affixed to and surrounding the outer ends of said turbine buckets, a second hollow annular duct, means for mounting said second duct on an aircraft, combined radial and axial thrust bearing means rotatably mounting said second annular ring in said second duct, said second duct enshrouding said bearing means and the forward sides of said turbine buckets, and means in said second duct for conducting gas under pressure to said turbine buckets for driving said fan, the hollow cylindrical space defined by said first duct providing a passage for air entrained by air passing through the fan at speeds up to low subsonic speeds and providing a bypass conduit for part of the air which otherwise the fan would face at high subsonic speeds and above.

6. The combination claimed in claim 5, said first duct comprising a streamlined body with leading and trailing edges disposed forwardly and rearwardly of the forward and rear edges of the inner ends of the fan blades.

7. The combination claimed in claim 6, said first duct having a thickness-to-length finesse ratio of no greater than about 10%.

8. The combination claimed in claim 5, the means for mounting said second duct on an aircraft comprising a stub wing connected to one side of said second duct.

9. The combination claimed in claim 5, the means for mounting said second duct on an aircraft comprising a wing having an edge portion extending diametrically across said second duct and affixed to diametrically opposite sides thereof, said edge portion being spaced from said fan and constituting a stator blade therefor.

10. The combination claimed in claim 9, said means in said second duct for conducting gas under pressure to said turbine buckets including an annular manifold, and a gas conduit in said wing connecting with diametrically opposite sides of said manifold.

11. A ducted fan for aircraft propulsion, comprising a bladed fan having hollow cylindrical body rigidly fixed to inner ends of the fan blades and defining a hollow cylindrical core surrounding an axial air passage which is substantially open and unobstructed from its front end to the rear end thereof,
a ring concentric with the hollow cylindrical body and rigidly affixed to the outer ends of said blades,
turbine means including buckets on the ring,
bearing means for rotatably mounting the turbine means on an aircraft,
and means for supplying propulsion gas to the turbine means.

References Cited by the Examiner

UNITED STATES PATENTS 2,864,552 12/1958 Anderson _____ 230—116
3,138,350 6/1964 Lovett _____ 230—116 X ROBERT M. WALKER, *Primary Examiner.*